Patented Sept. 16, 1941

2,256,047

UNITED STATES PATENT OFFICE 2,256,047

FOUNDRY COMPOSITION

Harry W. Dietert, Detroit, Mich., assignor to Peerpatco Incorporated, a corporation of Delaware No Drawing. Application March 14, 1941, Serial No. 383,423

5 Claims. (Cl. 22—188)

My invention relates broadly to compositions of matter and more particularly to such compositions as are used as binders for foundry purposes and to foundry compositions employing such binders.

One of the objects of my invention is the provision of a bonding agent which is fairly inexpensive, which is constituted of readily available materials and which can be used with good results in foundry practice.

Another object of my invention is the provision of a foundry binder which, when mixed with sand, will produce a composition having a desired high green strength, a desired moderate dry strength and an unusually high hot strength, (that is high strength at temperatures approaching 2500° F.), which binder is soft and free from stickiness, which has a high sintering point and which is readily available at low cost.

A further object of my invention is the provision of a foundry mold composition which can be prepared easily, which has good flowability, which can be rammed about a pattern without becoming impermeable to gases and fumes and which can withstand the effects of high temperature casting materials without cutting or washing away and without baking so hard as to be difficult to recover for repeated use.

Other objects in part will be obvious and in part pointed out hereinafter.

The invention accordingly consists in the combination of elements, mixture of materials and composition of ingredients, and in the several steps and relation of each of the same to one or more of the others as described herein, the scope of the application of which is indicated in the following claims.

As conducive to a clearer understanding of my invention, it may be noted at this point that it is conventional practice in the foundry art, in forming a mold for example, to mix together certain quantities of silica sand and bonding clay. This mixture then is tempered with water to give a more workable consistency to the mass. It is also economical at times to substitute a certain amount of burnt sand or bonded sand for a part of the clean silica sand.

While refractory and non-refractory clays are available throughout the United States, their use in the foundry is limited by certain characteristics they possess. The strength of foundry compositions in which such clay binders are used, is low unless a high percentage of clay is present in the mixture. On the other hand, too much clay in a foundry composition impairs the permeability of the composition. Thus it can be seen that when steps are taken to eliminate one undesirable feature of a mold composition, other disadvantageous features are likely to become more predominant in consequence. Therefore, it can be appreciated that the production of a foundry composition having consistently good working characteristics is no easy task. Many requirements must be met by such compositions, and it is difficult to produce a composition which is acceptable in all respects.

I find that certain types of casting, particularly heavy iron castings and steel castings which are poured at very high temperatures, must be formed in molds which have the highest possible hot strength at approximately 2500° F. Even though compositions comprising a clay binder of Wyoming bentonite have given best results in this respect, the expense of such clay, together with the other disadvantages previously mentioned have imposed a restriction upon its use.

One of the objects of my invention, accordingly, is the provision of a bonding composition which is readily available to the Eastern markets, which improves mold hot strength at high temperatures, which gives a mold composition of high sintering point, which in use has little limiting effect upon mold permeability, which lends a high green strength to a mold, which gives a foundry composition of high flowability permitting easy ramming about a pattern, and which permits shrinkage of the cooling casting material and which moreover, permits high recovery of that mold composition after use.

Considering now the practice of my invention, I find that a bonding composition comprising non-swelling, colloidal montmorillonite and iron oxide has many advantageous characteristics as pointed out hereinafter.

Typical sources of non-swelling, colloidal montmorillonite are the deposits found just south of Little Rock, Arkansas; the deposits near Monroe, Louisiana; near Jackson and Laurel, Mississippi, and near Pontotoc, Mississippi; those near Cunningham, Alabama and similar deposits in other States. The clay is now being obtained at Pontotoc, Mississippi.

The iron oxide which I use, is a readily available material. Although I can employ pure iron oxide as an ingredient in my foundry composition, I have found that commercial iron oxide will serve the purpose equally as well. Iron oxide, when added in relatively small amounts to non-swelling, colloidal montmorillonite, materially improves the hot bond strength of such clay, without affecting to any appreciable extent, the recognized advantageous results obtained by using non-swelling colloidal montmorillonite independently as a foundry bonding material.

An analysis of non-swelling montmorillonite shows that a certain amount of iron oxide is naturally present in the clay in both ferric ($Fe_2O_3$) and ferrous (FeO) forms. I find that the amount of iron oxide naturally occurring in such clay is insufficient to lend good high temperature bonding properties to the clays. I have overcome this disadvantage by mixing an additional amount of iron oxide with the non-swelling montmorillonite. Accordingly, mold compositions containing my non-swelling montmorillonite and iron oxide bonding material have unusually good hot strength around 2500° F. It is my belief that added iron oxide when present in non-swelling montmorillonite and sand mixtures, promotes a cementing action between the constituents of the mixture at high temperatures and thus imparts an improved hot strength to such compositions. The cementing action set up in the clay by naturally occurring iron oxide, is insufficient to enable good hot strength of mold to be attained at high temperatures. I do not wish, however, to be bound by this explanation.

In making a foundry mold composition in accordance with my invention, I form my foundry binder by adding together by weight 0.1% to 5%, or more, of iron oxide ($Fe_2O_3$), and 99.9% to 95% or less, of non-swelling, colloidal montmorillonite of the Pontotoc, Miss. type. The two ingredients are mixed to form a homogeneous mass. Thereafter, I add together by weight approximately 96% of clean silica sand, or silica sand including a certain proportion of burnt sand as desired; about 4% of the binder comprising non-swelling colloidal montmorillonite and iron oxide. The whole is mixed in the usual foundry mixers to obtain a fairly uniform consistency. Water is then added in desired amount, usually 2% to 5% by weight. The mixing is continued, giving a uniform mix of desired strength. The mold mix is then used in preparing a foundry mold in accordance with methods well known in the art.

My mold composition is easily worked. It flows freely for it is not gummy or sticky. It is rammed readily about a pattern. After the use of conventional jolt or other types of molding machines, the sand is packed tightly about the pattern. A smooth surface results accurately following the details of the pattern. Molds containing my composition are strong and durable. The mold is well retained within the cope as the pattern is withdrawn and is free of edge-breaks and cracks. The mold, therefore, requires very little repair before use, thereby enabling the production of clean, sound castings with a minimum of labor and expense. At the same time, however, the mold is permeable to gases encountered in actual practical use.

In addition to the highly desirable properties noted above, my mold composition possesses a satisfactory green strength, a desired moderate dry strength, a high sintering point, and a hot strength which at temperatures around 2500° F. exceeds that of any other molding composition now in practical use. Even mold compositions containing Wyoming bentonite, which are of repute for having high temperature hot strength, cannot compare with my composition at temperatures in the vicinity of 2500° F. Moreover, the binder ingredients which I use in my molding composition are obtainable more cheaply in the eastern part of the country than is Wyoming bentonite. Again, my binder ingredients are not of a swelling nature. Further, my composition has a desired moderate dry strength and this cannot be said for compositions containing a binder of Wyoming bentonite.

The improved nature of the molding composition of my invention is illustrated in the following tests. Sample mixes of 95% clean silica sand, 5% swelling montmorillonite and 2.5% moisture, by weight, are made for testing. Mixtures of 96% clean silica sand, 4% non-swelling, colloidal montmorillonite with 2% moisture content are prepared, some of which have added iron oxide present in the clay to the extent of 1%. Tests are made upon these mixtures in accordance with the recommended procedure of the American Foundrymen's Association. As a matter of convenience, information obtained from such tests is presented in the following table:

| Bond | Mixture A 4% non-swelling montmorillonite (Pontotoc, Miss.) plus 1% $Fe_2O_3$ | Mixture B 4% non-swelling montmorillonite (Pontotoc) | Mixture C 5% swelling montmorillonite (Wyoming bentonite) |
|---|---|---|---|
| Michigan City sand..percent.. | 96 | 96 | 95 |
| Moisture...do.... | 2 | 2 | 2.5 |
| Green compression strength p.s.i.. | 8.0 | 10.8 | 9.6 |
| Dry compression strength p.s.i.. | 44.0 | 38.0 | 83.0 |
| Hot strength: | | | |
| 1500° F...... | 50 | 26 | 195 |
| 2000° F...... | 60 | 15 | 490 |
| 2500° F...... | 10 | 0 | 8 |
| Sintering point °F.. | 2400 | 2410 | 2400 |

It is to be observed from the above data that the hot strength of foundry compositions containing a binder of non-swelling, colloidal montmorillonite is greatly improved when a small amount of iron oxide is added to the clay. Moreover, the addition of iron oxides to a composition having a sole binder of non-swelling, colloidal montmorillonite has little effect upon the very desirable green compression strength, dry compression strength, sintering point, high permeability and the excellent workability of the composition.

My new composition has the important advantage of being workable when moisture content is low. The lower moisture content is desirable since such moisture constitutes the major portion of gas evolved from a mold. Excessive generation of gas in a mold may cause the formation of gas flaws in the casting. This is especially true if the mold composition is of such insufficient permeability as not to allow the gases to escape. The use of my mold composition, therefore, doubly insures that no gas flaws will form in the casting, since moisture content therein can be kept low and since its permeability is high.

Accordingly, it is to be observed that my invention provides a composition and art of employing the same in which the various objects hereinbefore noted, together with many thoroughly practical advantages are successfully achieved. It will be seen that my bonding composition is well adapted to function properly in actual operational use, whether high working temperatures are encountered or not. Its use is valuable in many applications, particularly as a binder for lending unusually high temperature hot strength to said mold compositions.

To illustrate the practice of my invention description is made of a green sand mold, however, it is to be particularly understood that my invention gives beneficial results when it is practiced in the production of a dry sand mold or in either green or dry sand cores. Also, it will be understood that the various ingredients going to make up my mold composition may be mixed together in any desired sequences.

Similarly while the amount of clay and incorporated iron oxide binding mixture used is illustratively given as about 4% of the weight of sand with which it is mixed, it will be understood that good results are obtained when the amount of the binder comprising bonding clay and iron oxide ranges from about 2% to 8% of the sand weight. In fact, these proportions can be extended still further where a part of the sand consists of burnt sand since at least part of the binder ingredients are reversible in character and can be used over again. Where desired, the quantity of binder or binder ingredients, may be mixed with sand and the mixed sand added to sand systems or heaps to maintain a satisfactory volume of sand. Also, the total volume may sometimes become too great. In such event, to avoid discarding good sand, a mixture of 30% or even 50% of binder and sand might be used. A proportionately lesser quantity being added subsequently, however, in order to obtain relationship between binder and sand.

Although as illustrative of my invention a mold comprising silica sand, non-swelling colloidal montmorillonite and iron oxide is described, my invention is applicable to like combinations of sand, clay and iron oxide for other foundry uses. These include the preparation of facing sands which may consist of various combinations of new silica sand, burnt silica sand, lake sand or bank sand, together with my bonding material, to which may be added auxiliary binders in small quantities, such as cereal binders, cement, goulac, pitch or rosin and a casting cleaning element such as sea coal, wood flour or oils. Foundry sand compositions, comprising known sands and a non-swelling colloidal montmorillonite clay and iron oxide, are found to possess a certain superior strength as compared to known compositions. In these the clay and iron oxide can be added as a mixture or separately to foundry sands of any type which require strengthening by any method in common use.

As many possible embodiments may be made of my invention and as many changes may be made in the embodiments herein set forth, it is to be understood that all matter described herein is to be interpreted illustratively and not in a limiting sense.

I claim:

1. In a composition of matter, a mold composition consisting of a preponderance of sand, a clay of which montmorillonite is a large constituent and an added amount of iron oxide.

2. In a composition of matter, a mold composition consisting of silica sand and a binder of non-swelling montmorillonite of which 0.1% to 5% thereof is an added iron oxide.

3. In a composition of matter, a mold composition consisting essentially of silica sand and 2% to 8% by weight of a binder comprising non-swelling colloidal montmorillonite and an added amount of ferric oxide.

4. In a mold composition, a foundry binder consisting of a non-swelling colloidal clay of which montmorillonite is a large constituent and 0.1% to 5% by weight added ferric oxide.

5. In a composition of matter, a mold composition consisting of silica sand, and 2% to 8% of a binder consisting of non-swelling, colloidal montmorillonite and 0.1% to 5% ferric oxide.

HARRY W. DIETERT.